(No Model.) 7 Sheets—Sheet 1.

F. H. RICHARDS.
WEIGHING MACHINE.

No. 600,022. Patented Mar. 1, 1898.

Witnesses:
R. W. Pittman
Fred. J. Dole.

Inventor:
F. H. Richards.

(No Model.)  F. H. RICHARDS.  7 Sheets—Sheet 4.
WEIGHING MACHINE.

No. 600,022.  Patented Mar. 1, 1898.

Witnesses:
R. W. Pittman
Fred. J. Dole.

Inventor:
F. H. Richards (No Model.) 7 Sheets—Sheet 5.

F. H. RICHARDS.
WEIGHING MACHINE.

No. 600,022. Patented Mar. 1, 1898.

Witnesses:
R. W. Pittman
Fred. J. Dole.

Inventor
F. H. Richards

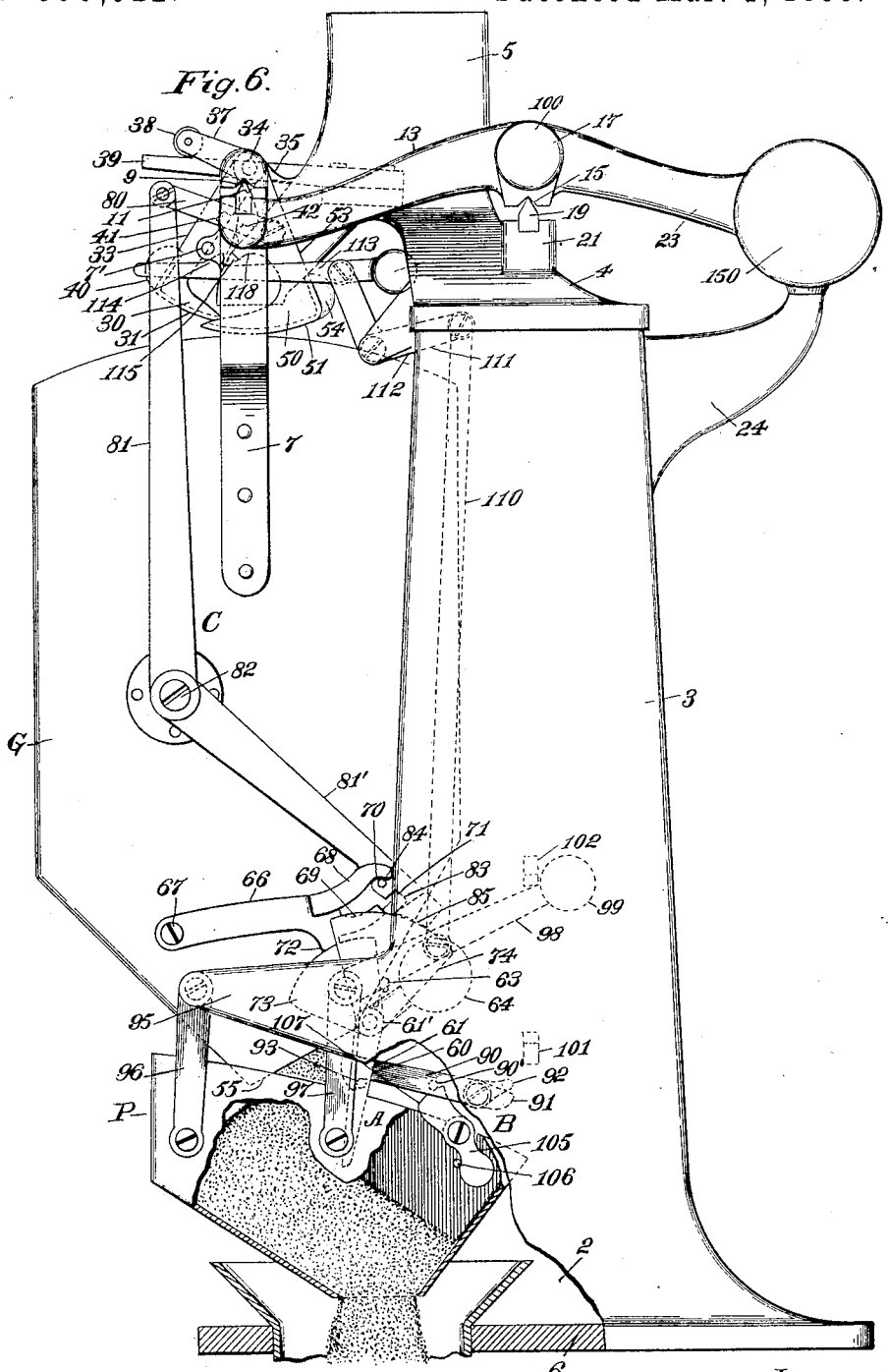

(No Model.)
7 Sheets—Sheet 7.
F. H. RICHARDS.
WEIGHING MACHINE.
No. 600,022. Patented Mar. 1, 1898.
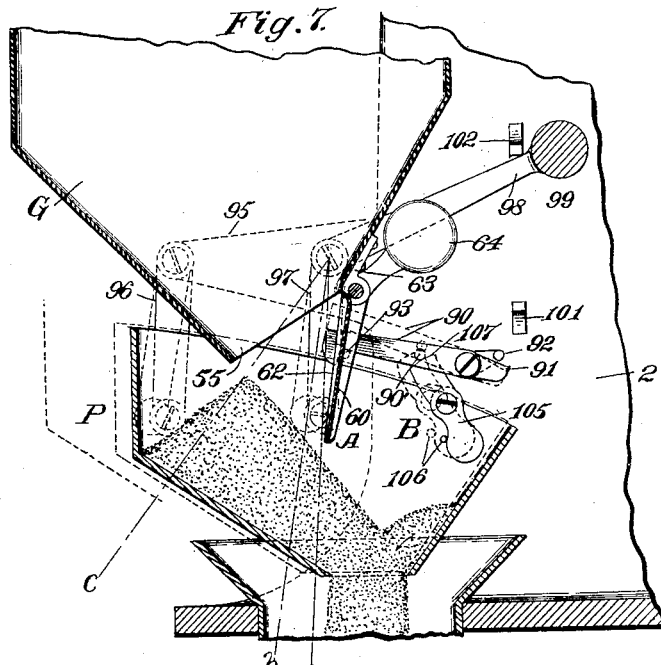
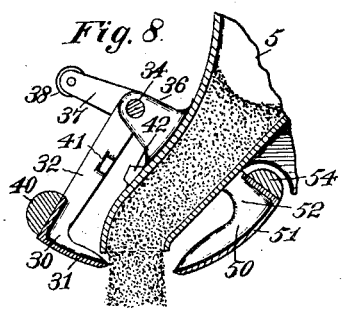
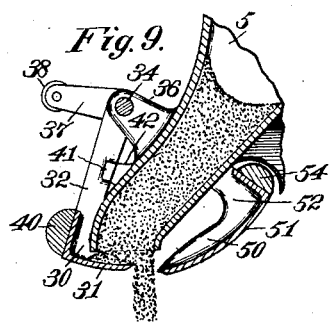
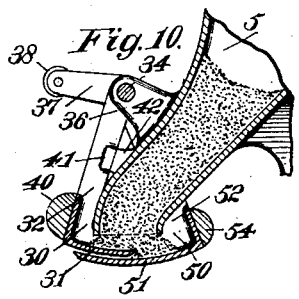
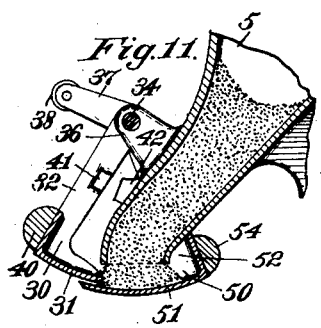
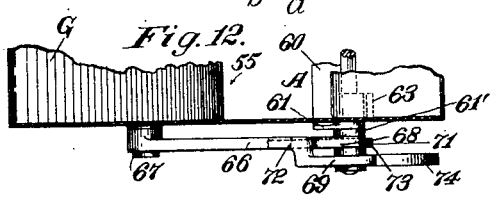
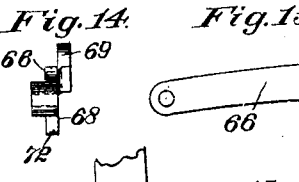
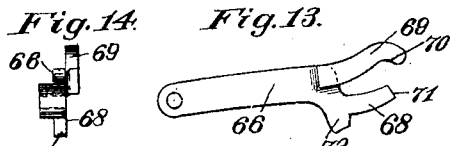
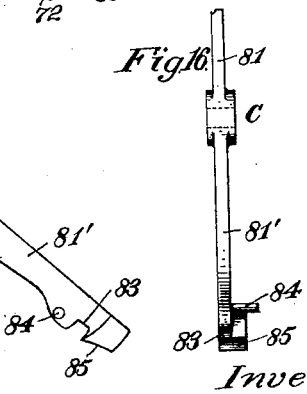
Witnesses:
R. W. Pittman
Fred. J. Dole.
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,022, dated March 1, 1898.

Application filed November 17, 1896. Serial No. 612,419. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object thereof being to provide an improved weighing apparatus comprehending, among other improvements, improved means whereby the load receiver or receptacle discharge-opening closer can be locked open and released or unlocked from such locked-open position during the operation of the machine and at the proper predetermined period; improved means for locking closed such discharge-opening closer when the supply-valve mechanism is open and for locking closed the valve mechanism when such discharge-opening closer is open, and improved regulator mechanism.

Figure 1:
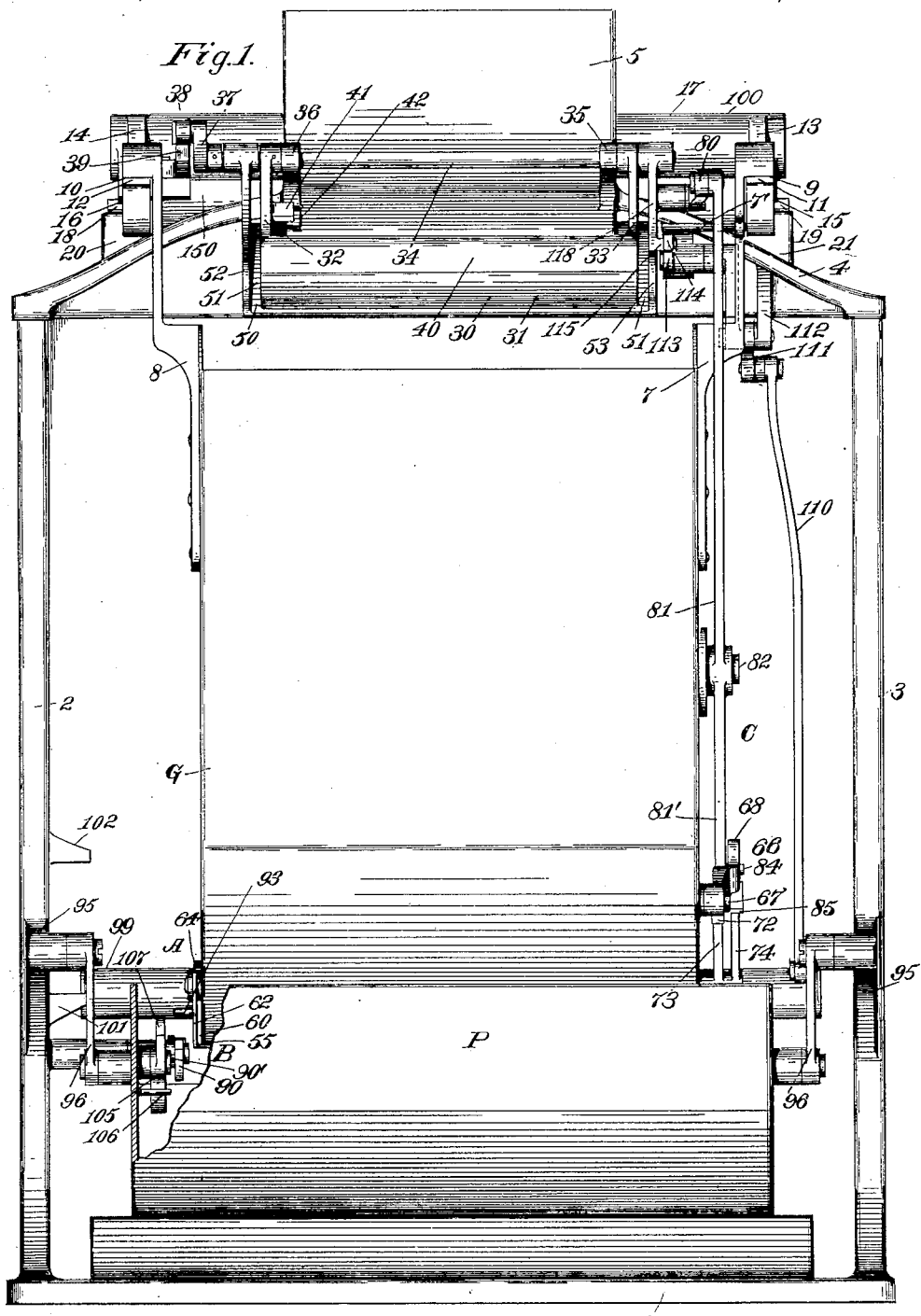
Figure 2:
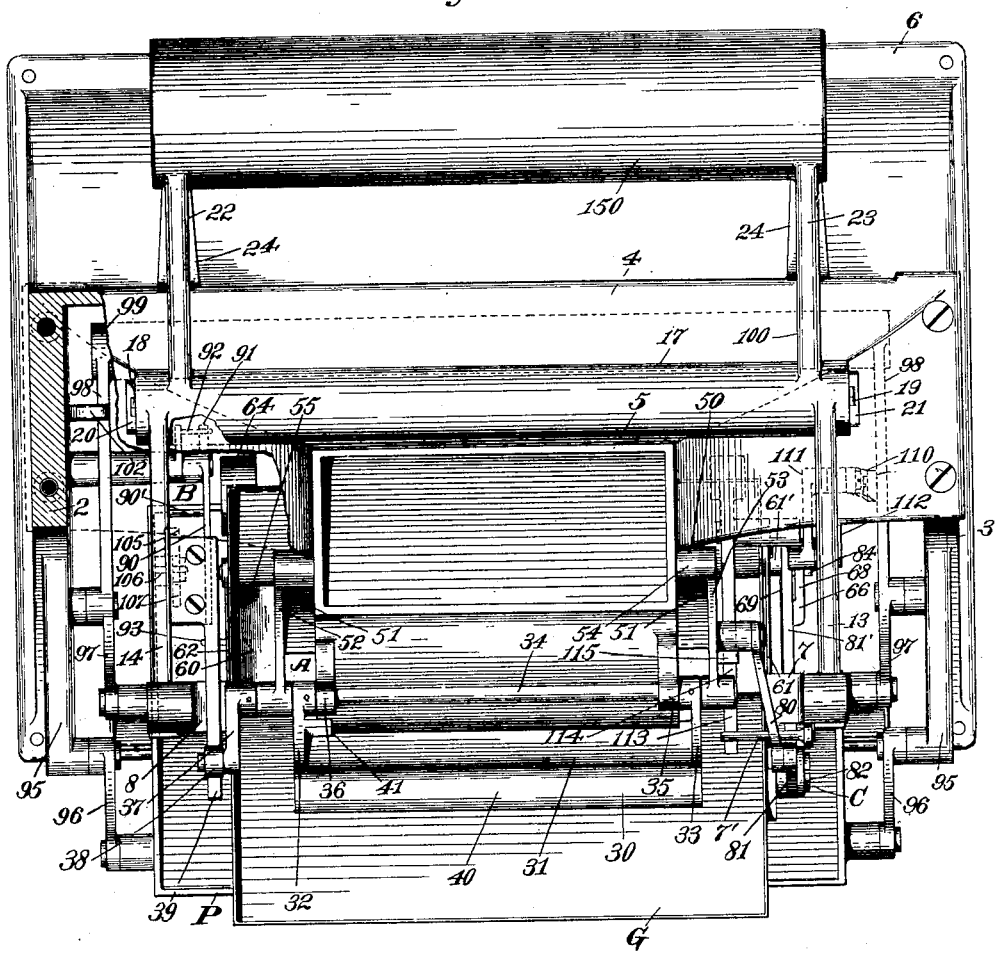
Figure 3:
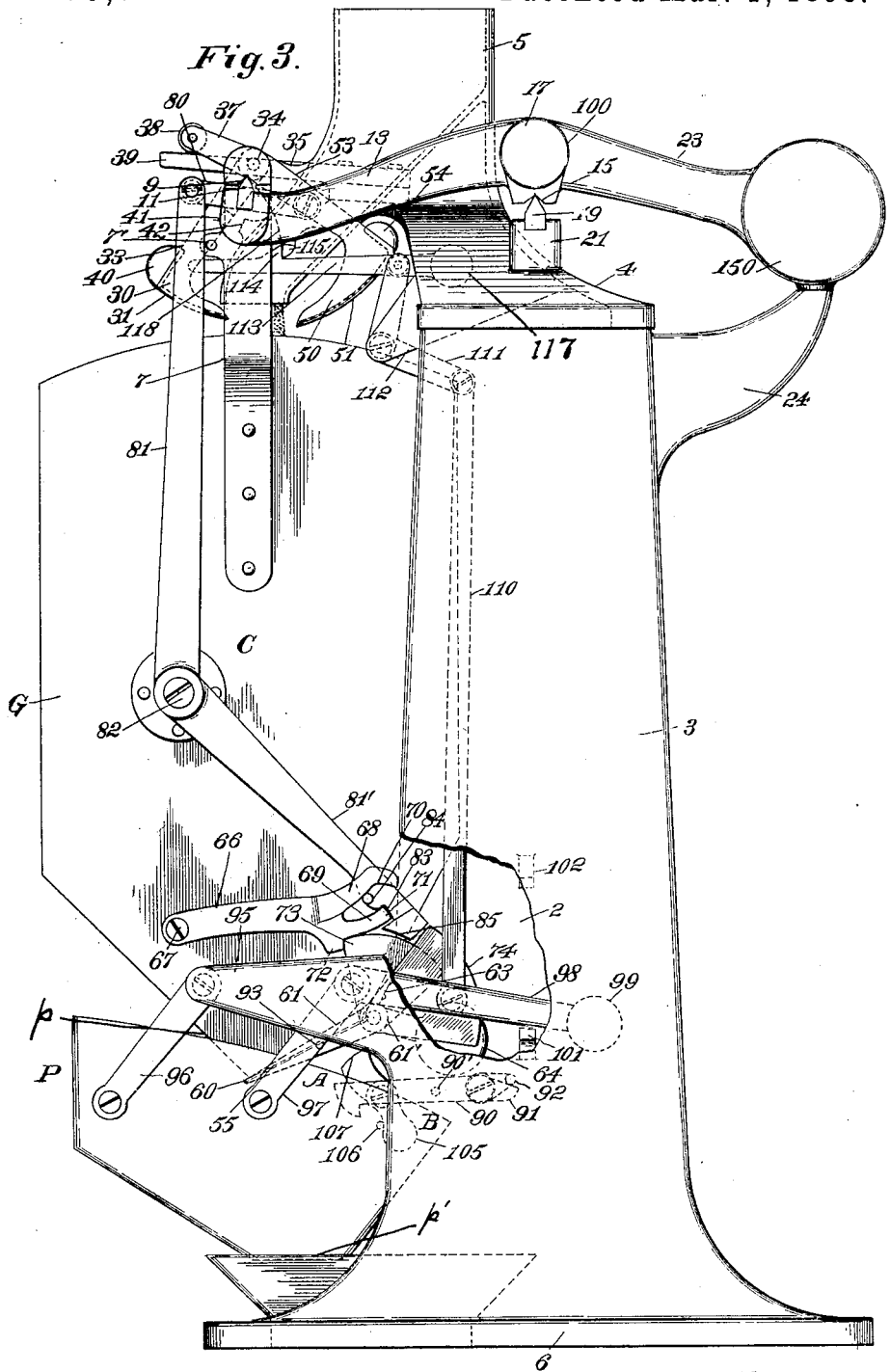
Figure 4:
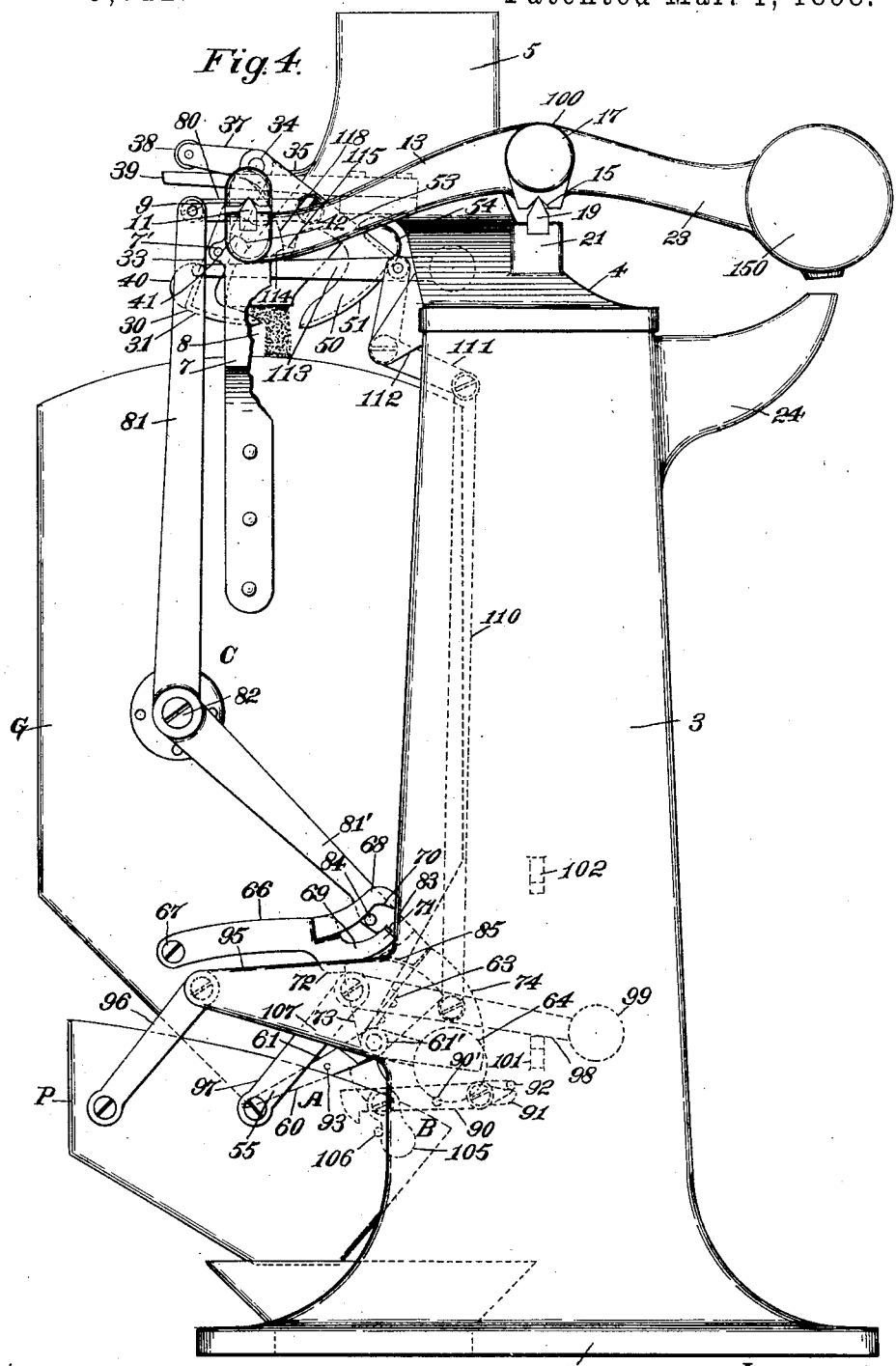

In the drawings accompanying and forming part of this specification, Figure 1 is a front view of this improved weighing-machine, a part of the regulator-hopper being broken away more clearly to illustrate a part of the mechanism. Fig. 2 is a top view of the same, a part of the top plate of the framework being broken away for a like purpose. Figs. 3, 4, 5, and 6 are side views, with part of the framework broken away, looking toward the left hand in Figs. 1 and 2, for the purpose of illustrating various positions of the operating mechanism during the operation of the machine. Fig. 7 is a cross-sectional view of the lower portion of the load-receiver and the mechanism adjacent thereto and taken through the center of the machine. Figs. 8, 9, 10, and 11 are cross-sectional views of the valve mechanism, illustrating the different positions of the valves. Fig. 12 is a horizontal sectional view of one side of the bucket and a top view of the closer latch or locker and lock-stops for locking the closer shut. Fig. 13 is a side view of such locker. Fig. 14 is an end view of the same, looking toward the right in Fig. 13. Fig. 15 is a side view of a part of the actuating-lever intermediate the valve mechanism and the closer mechanism; and Fig. 16 is a view of the same, looking toward the right hand in Fig. 15.

Similar characters designate like parts in all the figures of the drawings.

As a preface to a description of this improved weighing-machine it will be understood that various parts and mechanisms of the apparatus might be more or less modified without departing from the general scope of this invention and that the valve mechanism might be operated in various other ways than that herein shown—for instance, in a similar manner to the valve mechanism of various machines of this character heretofore patented by me and not deemed necessary to herein particularly specify, and, furthermore, that while a hopper in this construction is shown as the regulator by the movement of which the closer is released from its locked-open position it will be obvious that other means operable by means or independently of the discharging material or grain could be used to accomplish this purpose without departing from the spirit and scope of this invention.

The terms "open-locked" or "locked-open" and "closed-lock" or "lock closed or shut" positions, as herein used in this specification in connection with the load-receiver discharge-opening closer, will be understood to mean, respectively, those positions of the closer where it is held or locked open to permit the discharge of the material from the bucket and where it is held or locked closed to prevent such discharge therefrom.

This improved weighing machine comprises in a general way a supply-chute, a load receiver or receptacle and its beam mechanism, and valve mechanism for regulating the supply to the load-receiver, which parts, if desired, may be similar in construction and in their means of support to those heretofore described in my various previous patents, to one of which it is only deemed necessary to herein particularly specify—to wit, Patent No. 442,719, dated December 16, 1890, with such modifications as may be herein illustrated or pointed out; a closer (designated in a general way by A) for the discharge opening or spout of the load receiver or receptacle; means for locking the same open, and which means will be herein designated, for the purpose of this specification, as "open-lock-closer means or mechanism;" means (designated in a general way by B) for releasing or unlocking such open-locked-closer means or mechanism to thereby permit the closer to shut, and preferably shown operative with a regulator or regulating means, which latter is herein shown operable by the discharging load of material, and which regulator may or may not comprise a hopper, but in the present structure is so shown, and means (designated in a general way by C) and embodying interlocking means and operatively connected with the valve mechanism and closer mechanism for locking said closer shut on the opening of the valve mechanism and for locking the valve mechanism closed on the opening of said closer, and a part of which mechanism C will be herein designated, for the purpose of this specification, as "closed-lock-closer means or mechanism."

The framework for carrying the operative parts of the machine may be of any desired construction, but preferably comprises two side frames or uprights 2 and 3, connected together at the top by a top plate 4, carrying a supply-chute 5, and at the bottom by a beam or base-plate 6.

The material or load receiver or receptacle (designated generally by G) may likewise be of any desired construction, but is herein shown as a bucket, preferably of the "single-chambered" type or class, and is supported under the supply-chute 5 by means of the hangers or bails 7 and 8, that are herein shown fixed to the bucket and are preferably supported by V-shaped bearings 9 and 10 on the pivots (preferably knife-edge pivots) 11 and 12, carried by the bucket-supporting arms 13 and 14 of the scale-beam 100. This beam 100 has suitable bearings for supporting the same in its oscillations, and which bearings in this structure are shown comprising V-shaped bearings 15 and 16, one adjacent to each end of the shaft 17 thereof, and which rest on the pivots or knife-edges 18 and 19, that are suitably supported by bearings 20 and 21 on the framework.

Extending rearwardly of the scale-beam shaft 17, opposite to the bucket-supporting arms 13 and 14, a pair of weight-supporting arms 22 and 23 are shown, and which arms carry a weight 150, preferably rigidly secured thereto. It will be understood that such weight could be of various constructions and might, for instance, be similar to the character of weight set forth in my patent above cited, if desired, in which case it would preferably be carried by one arm extending rearwardly from such shaft 17. The weight 150, in the present form thereof, when in its normal position or position of rest, is shown supported and resting on a pair of bracket arms or supports 24, extending from the rear of the framework.

The valve mechanism for regulating the supply of material to the bucket in the present apparatus preferably comprises a pair of swinging or oscillatory valves, one operable to reduce the flow of such material, and therefore herein designated as the "reducing-valve," and the other operable to completely cut off such flow and therefore herein designated as the "cut-off" valve. The reducing-valve 30 comprehends a valve-blade 31, provided with arms 32 and 33, one at each end thereof, and which arms are shown fixed to a rock-shaft 34, herein shown supported in bearings 35 and 36 on the chute 5. This shaft is shown extending beyond the valve-arms 32 and 33 and chute side walls and constitutes a means for supporting the cut-off valve hereinafter described. Said rock-shaft carries at one end thereof a crank-arm 37, extending approximately at right angles to the valve-arms 32 and 33 and likewise fixed to said shaft, whereby it is simultaneously operable with the reducing-valve 30. The free end of this crank-arm is provided with a bearing, herein shown in the nature of a roll 38, in engagement with the upper side of a beam-arm 39, secured to or formed upon one of the arms, as 14, of the scale-beam 100, and which beam-arm 39 extends across the line of the valve-axis and beyond the valve-blade, whereby on the upward movement of the bucket-supporting arms 13 and 14 of the scale-beam the valve will be opened. This reducing-valve 30 is shown in this instance provided with a weight 40, preferably formed therewith, whereby said valve is a "gravity self-closing" valve, operable on the downward movement of the bucket to close and reduce the stream of material. The closing of this valve is limited by means of a suitable stop 41, formed on one of the valve-arms, as 32, or at any other desired place, for engaging with a similar stop 42, formed on the chute. From the foregoing it will thus be seen that the reducing-valve is operated on the rise and fall of the bucket through the medium of the beam-arm 39 and the valve-weight 40.

The cut-off valve 50 is herein shown comprising a concaved valve-blade 51, carried by a pair of arms 52 and 53, one at each end thereof, and which are pivotally secured on the rock-shaft 34 for oscillation or rocking movement. This valve is likewise shown as a gravity self-closing valve and therefore provided with a weight 54, substantially similar to the weight of the reducing-valve, whereby the valve at certain predetermined periods in the operation of the machine will swing into position to completely cut off the flow of material to the bucket in a manner more clearly hereinafter set forth. The closing movement of this valve in this instance is shown limited by the rear wall of the valve-blade engaging with the wall of the chute, Fig. 11, although other limiting means might be used. The weights for the valves will be experimentally determined in the first instance in order to secure the proper action of such valves. This cut-off valve is opened and held open in this structure by means of a lever system shown operable by a regulator, herein illustrated as a "hopper," and which lever system will be hereinafter more particularly described, together with the means for permitting such valve to close through the medium of its weight.

The bucket-closer A, in its preferred form herein shown and described, comprises a suitably-formed plate or closer proper, 60, having arms 61 and 62, preferably, and usually formed rigid or integral therewith and pivotally secured to the bucket by brackets 63, whereby said closer is in position to operate at the discharge opening or spout 55 of the bucket G, and which is herein shown at the lower end thereof. In order that the closer may be self-operating to close such discharge-opening of the bucket after the discharge of the material therefrom, suitable means is provided for actuating the same, and in one form thereof it comprises a weight 64, carried at the free end of a rearward extension of one of the arms, as 62, of said closer, and which weight will be sufficient to counterbalance and quickly shut the closer, but insufficient in itself to maintain the same closed against the weight of the load in the bucket. Therefore in order to maintain the closer in closed position during the loading of the bucket and while the valve mechanism is open and until after the same is completely closed and the supply of material to the bucket cut off suitable locking mechanism is provided, herein designated as "closed-lock-closer means or mechanism," and which in its preferred form illustrated comprehends a locker, shown in the nature of a latch, and operable in connection with a suitable stop. This locker 66 is pivotally secured—in this instance at one side of the bucket—by some suitable pivotal device 67, and it involves in one form thereof a series of working parts, and in this particular instance such working parts are carried by a pair of projecting arms 68 and 69, one of which, as 68, is laterally disposed relatively to the other and is provided with a cam-shaped under face 70, for the purpose hereinafter set forth. The outer arm, as 69, in this instance is provided with a pair of stop-faces or stops, one, as 71, at the outer end thereof, while the other is in the nature of a projection 72 on the under side of said arm. The closer is shown having the hub 61' of one of its arms, as 61, and preferably that one which does not carry the weight, formed with a plurality of working parts, herein shown comprising a pair of stops 73 and 74 and illustrated in the nature of sectors. These sector-stops are disposed side by side in parallel planes, but one somewhat forward of the other, so that only a portion of each stop overlaps the other, and one, as 74, is herein shown preferably having a somewhat longer radius than the other. The sector-stop 73 is so disposed relatively to the closer that the stop 72 of the locker 66 will engage the forward side of said sector-stop when said closer is shut and when said locker is in its normal locking position, Fig. 3, whereby the closer will be prevented from opening regardless of the amount of material that may be pressing against the same. In order that this locking-closed locker-latch 66 may itself be locked against movement, suitable mechanism adapted to accomplish this object is provided, and which mechanism preferably comprises a lever system, shown involving a pair of levers, one being in the nature of a locking link or lever 80, pivotally connected at one end with one of the arms, as 53, of the cut-off valve 50 of the valve mechanism and at its opposite end to the upper end of the other lever 81, which is shown herein in the nature of a bell-crank lever pivotally secured by a pivotal device 82 to the bucket. The lower or free end of one of the members 81' of this bell-crank lever 81 is provided with a series of working parts, one of which is in the nature of a notch or recess 83 for the reception of the stop or stop-face 71 of the arm 69 of the locker-latch 66, whereby movement of the latch is prevented when said member 81' and latch are interlocked, and whereby the stop 72 of the latch is maintained in engagement with the sector-stop 73 of the closer, thereby holding such closer tightly and firmly shut against the weight of the material in the bucket. In order, however, to raise the locker 66 and permit the opening of the closer at the proper predetermined period in the operation of the apparatus and thus permit the discharge of the bucket-load, the member 81' has one of its working parts, preferably comprising a laterally-extending projection, herein shown as a pin 84, in engagement with the cam-face 70 of the arm 68 of the latch 66, whereby on the outward movement of the member 81' of the lever 81—which movement takes place on the closing of the cut-off valve 50—the stop 71 of the latch 66 will be first disengaged from the recess 83, thus unlocking the latch 66 and lever 81, and then such latch 66 lifted by the pin 84, thereby disengaging the stop 72 of said latch from the sector-stop 73, whereby the closer can open in a manner that will be obvious from the foregoing description. The bell-crank lever thus not only actuates the locker, but also retains the same in inoperative position and permits the return of said locker only after the closer is shut and the cut-off valve is opening.

Figure 5:
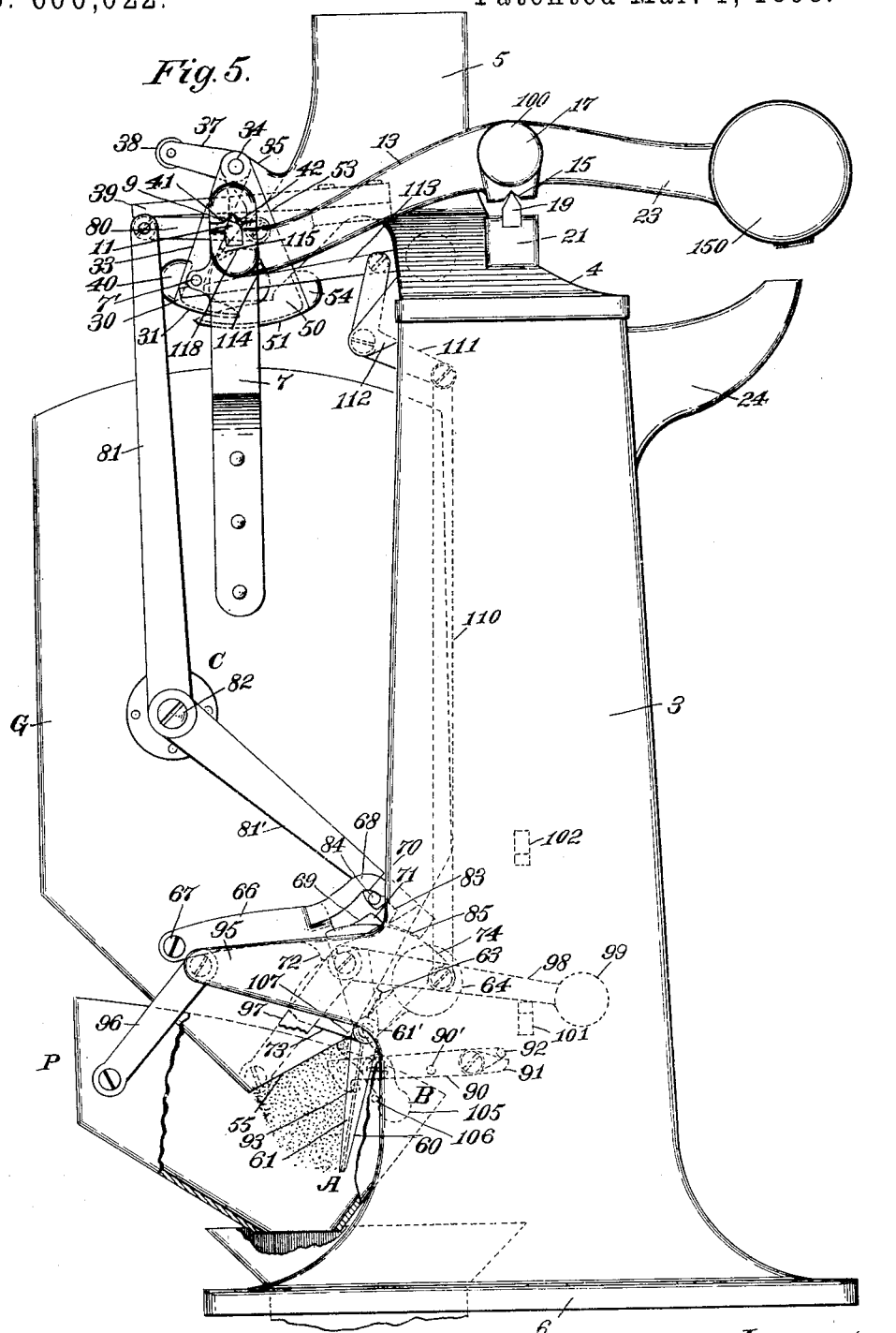

In the present construction of weighing-machine when the closer is open the cut-off valve is closed and locked to prevent the flow of material to the bucket, this being accomplished in this instance by forming one of the working parts of the member 81' of the bell-crank lever 81 with a stop-face 85, preferably conforming to the periphery of the sector-stop 74, whereby when the closer is open such stop-face 85 will engage the sector-stop 74 of said closer, Figs. 5 and 6, which is swung into position to permit such engagement by the opening of the closer, and thus lock the cut-off valve 50 closed through the medium of the bell-crank lever 81 and its locking link or lever 80.

From the foregoing it will be clearly seen that on the closing movement of the cut-off valve 50 the member 81' of the bell-crank lever 81 will first be actuated to release the interlocking parts of said member 81' and latch 66 and then during the latter part of its closing movement to move the pin 84 of said member 81' into operative engagement with the cam-face 70 of said latch to thereby raise said latch and disengage its stop 72 from the sector-stop 73, and thus unlock the closer and permit the weight of the material in the bucket to open the same to thereby unload said bucket. The concaved stop-face 85 of said member 81' at this period engages the sector-stop 74 and holds the cut-off valve 50 tightly closed during the entire time that the closer is open and until said closer is again in its normal closed and locked position.

When the closer is opened, it is locked in such open position by open-lock-closer means or mechanism, which is disposed in position to engage said closer and lock the same open, and which locking means in its preferred form comprehends a locking device, shown in the nature of a locker-latch 90, herein illustrated pivotally secured to one of the side frames, as 2, of the framework and therefore carried independently of the load-receiver and preferably below the plane of the closer when shut. This locking-latch is provided with a rearwardly-extending inclined faced arm or part 91, adapted to engage a stop 92, (see Fig. 2,) shown formed as a part of the hub on which said locking device is mounted, and by means of which stop the downward movement of said locker-latch is limited. This locker-latch has a hooked end adapted to engage a laterally-extending projection, herein shown as a pin 93, carried by one of the arms, as 62, of the closer and thereby lock such closer open, and which locking action is accomplished during that part of the downward movement of the bucket which immediately follows its poising movement, at which time the closer is opened and carried into such position that its pin 93 passes the curved outer face of the latch and under the hook thereof, Fig. 5, whereby it will be held in open-locked position during the entire discharge of the bucket.

After the complete discharge of the bucket-load and before the valve mechanism opens it becomes necessary that the closer should be released or unlocked from its open-lock position to permit the same to close by means of its counterbalance-weight 64 and thereby close the discharge opening or spout of the bucket, and to accomplish this purpose suitable means is provided for unlocking or releasing such closer from its locking device 90, and which unlocking or releasing means (designated in a general way by B) in its preferred form is herein shown operative in connection with a regulator or regulating means, which, therefore, to a certain extent, may in this form of structure constitute a part of such unlocking means or mechanism. In one preferred form thereof herein shown and described this regulator or regulating means comprises a hopper (designated in a general way by P) operable in one direction by the discharging load and supported to have a rising-and-falling movement in an inclined direction for the purpose of increasing its working stroke over what would be due to its difference of elevation in its extreme positions. As one means of supporting this hopper P, which may be of any suitable form and construction, having the usual receiving-mouth $p$ at its upper side and shown in this construction with an independent discharge-mouth $p'$ below such receiving-mouth $p$, the uprights or side frames 2 and 3 of the framework are provided with a pair of forwardly-extending brackets or projections 95, one at each side of the bucket G. To each of these brackets 95 the hopper is movably secured by means of a pair of parallel levers or arms 96 and 97, the lower ends of each pair of said arms being pivotally secured to each side of the hopper, respectively, while the upper ends thereof are pivotally secured to the brackets, whereby the hopper is supported for movement in a permanently-level position in intersecting planes, and also preferably in such position that the discharge end or mouth of the load-receiver is within the regulator, whereby when such regulator is in position to discharge its load the fluffing out or flowage of the material over the sides of such regulator is practically avoided. One pair of the hopper-arms—as, for instance, the arms 97—is formed with a pair of rearwardly-extending levers 98, the outer ends of which support a counterbalance-weight 99, which in this form of mechanism is shown as rigid or integral with such levers, and which weight is sufficient to hold the hopper in its normal unloaded position below the bucket. The rising-and-falling movement of the hopper is limited by suitable means, such as stops 101 and 102, shown extending laterally from one of the side frames, as 2, and in position to engage the upper and lower faces of one of the levers 98, carrying the hopper-weight 99.

The closer-open-lock-unlocking means proper in this structure is preferably illustrated operative with the regulator, and it is herein shown carried by the regulator and is preferably in the nature of a latch 105, pivotally secured to one side of said regulator and held in position to engage the locking-latch 90 by means of a stop, such as pin 106, on the regulator. This unlocking-latch 105 has a cam-faced end 107, adapted to engage a laterally-extending projection, herein shown as a pin 90' of the latch 90, whereby it will be seen, Fig. 7, that after all of the grain or other material has left the bucket G and the major portion thereof has likewise passed out from the regulator-hopper the same is returned by means of its weight, whereby, the unlocking-latch 105 having been brought into engagement on the rearward movement of the hopper with the laterally-extending pin 90' of the closer-open-lock latch 90, Fig. 7, and which latter has been drawn upward, Figs. 5, 6, and 7, by the reascent of the bucket to its poising-point, which took place on the discharge of material equal in amount to that which was received by said bucket after the reducing-valve reduced the flow thereof, the cam-face of the latch 105 on the continued forward return movement of the regulator raises the locking-open latch 90 (see dotted lines, Fig. 7) and unlocks the same from the laterally-extending pin 93 of the closer and thus permits the same to close by means of its counterbalance-weight 64.

The dotted lines $a\,b$, Fig. 7, approximately indicate that period in the return movement of the hopper during which the closer is unlocked, while the lines $b\,c$ indicate that period in the movement of said hopper during which the valve mechanism is operated to permit a resupply to the bucket.

The means for opening the cut-off valve 50 after the closer completely shuts the discharge-opening of the bucket comprises in the present construction a lever system, the actuating-lever 110 thereof having its lower end pivotally secured to one of the weight-arms 98 of the regulator-hopper and its upper end to a rocking lever 111, in the nature of a bell-crank lever, which is pivotally secured to a projection or bracket 112 of the framework. Pivotally secured to the opposite end of this bell-crank lever 111 is a valve-catch lever 113, provided with a catch 114 for engaging a laterally-extending catch 115, formed on an extension 118 of one of the valve-arms, as 53, and whereby the cut-off valve can be opened at the proper period in the operation of the machine. The opposite end of this catch-lever 113 is provided with a counterbalance-weight 117 for limiting the downward movement of the same, the upward movement of such lever, due to the tendency of the weight, being limited by the laterally-extending catch 115 of the valve in a manner that will be readily understood from an inspection of the drawings. In order to release this catch-lever 113 and permit the closing of the cut-off valve at the proper period, one of the bucket hangers or bails, as 7, is in this construction provided with a laterally-extending pin 7', carried by a projection of said hanger and in position to engage said catch-lever 113 at that period in the downward movement of the bucket immediately after its poising period, to thereby release said catch-lever from the catch 115 of the cut-off valve and permit the weight of the same to quickly and completely close said valve and thereby cut off the drip. This catch-lever is again moved forward to reëngage the catch 115 of the valve by the rearward movement of the regulator-hopper, which thus moves the weight-lever 98 upward, thereby actuating the lever system 110, 111, and 113 and carrying the catch 114 into position to engage the catch 115, whereby on the return or forward movement of the hopper after the closer is shut the cut-off valve will again be opened to permit a new supply to the bucket.

From the foregoing it will be seen that the operation of this improved weighing-machine is substantially as follows: When the supply-valves are completely open, Fig. 3, the supply to the bucket will be continuous and uninterrupted; but when the bucket has received a sufficient amount of material to counterbalance its weight 150 said bucket will then descend to its position of poise, and during which movement the beam-arm 39 descends therewith and permits the descent of the roll 38, and likewise the descent of the weighted reducing-valve 30, Fig. 4, thereby reducing the flow of material to a drip, and when the bucket has received a sufficient amount of material to overcome its position of poise it still further descends, during which movement the pin 7' of the hanger engages the catch-lever 113, thereby disengaging the catches 114 and 115, and thus releases the cut-off valve 50, which immediately swings into position to cut off such drip, Fig. 5. The closing of the cut-off valve 50 operates the link-lever 80, and thereby the lever 81, to first disengage the recess 83 from the locker 66 and then raise said locker by means of the pin 84 and permit the weight of the material to open the closer, which is locked open by the locking device 90, and which opening movement of the closer carries the sector-stop 74 into engagement with the stop-face 85 of the member 81' of the lever and thus locks the cut-off valve closed, Fig. 5. After a discharge from the bucket of an amount of material equal to the amount received after the reducing-valve 30 is closed the bucket rises to its poising-point, carrying the closer upward therewith, and likewise its locking-latch 90, which, however, still retains the closer open, Fig. 6. During this return upward movement of the bucket the beam-arm 39 in this particular construction of machine operates the roll 38 of the reducing-valve and opens such valve; but owing to the construction of the cut-off valve 50, whereby the same completely underlaps such reducing-valve even when said reducing-valve is in its open position, Fig. 11, the valve mechanism is still locked closed, and the supply of material thus remains completely and thoroughly cut off. At this period in the operation of the machine the regulator or regulator-hopper has been moved rearwardly by the discharging load of material, Fig. 6, whereby the releasing-latch 105 is brought into engagement with the open-lock closer-latch 90, whereby on the return or forward movement of said regulator, Fig. 7, the releasing-latch is operated to unlock the closer, which immediately swings into position by means of its weight to shut the discharge-opening of the bucket. Said closer is then relocked in such closed position by the locker 66 on the opening movement of the valve, which occurs during the return or forward movement of the hopper, by means of the lever system 110, 111, and 113 in the manner heretofore described, and which valve during its opening movement operates the bell-crank lever 81, thereby carrying its pin 84, which is in engagement with the cam-face 68 of the locker 66, inwardly, and thus permits the descent of said locker 66 to lock said closer, and which locker 66, by the reëngagement of its stop 71 in the recess 83 of the member 81' of said lever 81, is then also locked. In the operation of this form of weighing-machine it will thus be seen that the operating mechanisms are so timed that the discharge-opening closer is not opened until the cut-off valve is completely closed; that the cut-off valve is not opened until the closer is completely shut; that when the closer is open the cut-off valve is locked against opening; that when said cut-off valve is open said closer is likewise locked against opening, so that the closer is locked shut during the entire time the bucket is being supplied with material and until after the valve mechanism is completely closed; that the cut-off valve is locked closed during the entire time that the closer is open and until after said closer is completely shut, and that such closer is locked open during the entire and complete discharge of the material from the bucket, the releasing of such closer from its locked-open position taking place only after such complete discharge from the bucket and when the major portion of the material has passed out from the regulator-hopper, at which time only it commences to return, and which thus insures the complete discharge of the bucket-load. It will furthermore be seen that the hopper has movements in two intersecting planes simultaneously—that is to say, it has a rising-and-falling movement in a vertical or perpendicular direction, while simultaneously therewith it has a relatively long movement in a direction transversely of its rising-and-falling plane of movement, whereby the regulator moves in the same inclined direction at all times and thus remains constantly level. From this it will be seen that the hopper when in its normal stationary position is in one horizontal plane, and that when in its lowermost position it is in another horizontal plane, and that when in such lower horizontal position or plane it is in a vertical plane different from and relatively remote to that vertical plane which it was in when in its upper horizontal position or plane, and vice versa, so that owing to this particular construction and organization the hopper, while it carries the material downward, also carries it transversely of its direction of flowage, and hence laterally of and away from the mouth of the load-receiver mouth, and so acts to draw the material away from the discharge-opening of the bucket and not retain the same in a compact mass below such opening, as is the case with hoppers that have simply a tilting movement.

Having described my invention, I claim—

1. The combination of a load-receiver having a shiftable member operative to discharge a load; locking means carried free of the load-receiver and adapted to lock said shiftable member in its open position; and load-discharge-operated regulator mechanism operative to engage and raise at the point of engagement therewith, said locking means thereby to unlock said shiftable member and permit the same to shut.

2. The combination of a load-receiver; a closer therefor shiftable to discharge a load; a locking-latch carried free of the load-receiver and below the plane of the closer when in its closed position for locking said closer in its open position; a regulator movable in one direction by the discharging load; and means carried by said regulator and adapted to engage said locking-latch thereby to unlock the closer and permit the same to shut.

3. The combination with framework, of a movable load-receiver; a closer therefor shiftable to discharge a load; means carried by the framework and independently of said load-receiver for locking the closer open; and means movable in a plane coinciding with the plane of movement of said locking means and operative to engage said locking means to unlock said closer thereby to permit the same to shut.

4. In a weighing-machine, the combination with framework, of a load-receiver provided with a member shiftable to discharge a load; a locking-latch carried free of said receiver and pivotally secured to said framework and operative to lock said shiftable member in its open position; a regulator operable in one direction by the discharging load; and an unlocking device pivotally secured to said regulator and operative therewith on its return movement to directly engage and raise at the point of engagement therewith said locking-latch thereby to unlock the closer and permit the same to shut.

5. The combination with framework, of weighing mechanism provided with a member shiftable to discharge a load; means for locking said member shut; means supported on said framework and carried free of the load-receiver for locking said shiftable member open; and regulator mechanism operative to engage and raise at the point of engagement therewith said last-mentioned locking means, thereby to unlock said shiftable member from its open-lock position and permit it to shut.

6. In a weighing-machine, the combination, with framework, of a permanently-level regulator; and a plurality of depending arms pivotally connected to said regulator and to said framework, one or more of said arms being disposed at each side of said regulator, whereby said regulator will be maintained in a level position throughout its movements.

7. The combination with weighing mechanism embodying a load-receiver provided with a shiftable closer, of a valve operative to regulate the supply of material to said receiver; means for locking the valve shut when the closer is open and for locking the closer shut when the valve is open, and comprising a multiplicity of coacting members, one of which coacts with a closer member to lock the closer shut when the valve is open, and another of which is connected with the valve and coacts with said first-mentioned member to assist in locking said closer shut, and then coacts with another closer member to lock the valve shut when said closer is open.

8. The combination, of a bucket or receptacle provided with a closer shiftable for discharging the load; means for locking the closer in its open position; a permanently-level regulator having movements, simultaneously, in two intersecting planes and operable in one direction by the discharging load; and means operative with said regulator, for unlocking the closer to thereby permit the same to shut.

9. The combination, of a bucket or receptacle provided with a closer shiftable for discharging the load; means for locking the closer in its open position; a permanently-level regulator having movements in two intersecting planes and operable in one direction by the discharging load; and means operable in the same planes of movement therewith for releasing the locking means to thereby permit said closer to shut.

10. The combination with framework, of a load-receiver; a closer for said receiver and shiftable to discharge a load; a locking-latch supported on said framework and carried free of said load-receiver and operative to lock said closer open; a load-discharge-operated hopper disposed below said load-receiver; and a shiftable latch carried on said hopper at one side thereof, and operative therewith on its return movement to engage and raise said locking-latch thereby to unlock the closer and permit the same to shut.

11. The combination with weighing mechanism embodying a load-receiver provided with a shiftable closer, of a valve operative to regulate the supply of material to said receiver; means for locking the valve shut when the closer is open, and for locking the closer shut when the valve is open, and comprising a locker for locking the closer shut, and a connector non-connected with the closer and connecting the locker with the valve and operative on the opening of the closer to itself coact with said closer to lock the valve shut.

12. The combination, of a bucket or receptacle provided with a closer shiftable for discharging the load; a locking-latch for locking the closer in its open position; a permanently-level hopper having movements in two intersecting planes, simultaneously, and movable in one direction by the discharging load; and a latch carried thereby and operative therewith on its return movement for unlocking the closer to thereby permit the same to shut.

13. The combination, with weighing mechanism embodying a bucket or receptacle provided with a closer shiftable for discharging the load and having a laterally-extending pin, of a locking device also having a laterally-extending pin and operable to engage the closer-pin to lock said closer in its open position; a hopper movable in one direction by the discharging load; and a cam-faced latch carried thereby and operative therewith on its return movement to permit its cam-face to engage the pin of the locking device and thereby unlock the same from the pin of the closer to permit the same to shut.

14. The combination, with weighing mechanism embodying a bucket or receptacle provided with a closer shiftable for discharging the load and having a laterally-extending pin, of a latch also having a laterally-extending pin and operable to lock said closer in its open position; a stop device for limiting the movement of said latch; a permanently-level hopper having movements simultaneously in two intersecting planes and operable in one direction by the discharging load; and a cam-faced latch carried thereby and operative to engage the pin of the latch on the return movement of said hopper, to thereby unlock said closer-locking latch and permit the closer to shut.

15. In a weighing-machine, the combination with weighing mechanism embodying a movable load-receiver having a load-discharge mouth, of a permanently-level, bodily-movable regulator; downwardly-extending arms supporting said regulator in position below said receiver to permit the discharge-mouth thereof to be within said regulator when said receiver is in position to discharge its load, said regulator being operative by the discharging material and having its principal movement in a direction transversely of the plane of movement of the load-receiver, whereby the discharging material is carried transversely of its direction of flowage and laterally of and away from the discharge-mouth of said receiver, thereby to prevent the compacting of the discharging material adjacent to said receiver-mouth.

16. In a weighing-machine, the combination with weighing mechanism embodying a load-receiver; a permanently-level, bodily-movable regulator having pivotal connection to its support above the lower end of said receiver and in position below said receiver to have the discharge-mouth thereof within said regulator when the load-receiver is in position to discharge its load.

17. The combination of a load-receiver provided with a shiftable member operative to discharge a load; a valve operative to regulate the supply of material to the load-receiver; a shiftable locker for locking the shiftable member shut; and means, directly secured to said load-receiver and having a linkage connection with said valve and in permanent engagement with said locking means, and operative, by the valve on the closing thereof, to actuate and disengage the locking means from said shiftable member, and thereby permit said member to open and discharge the load.

18. The combination with weighing mechanism embodying a load-receiver provided with a shiftable closer carrying a stop, of a valve operative to regulate the supply of material to said load-receiver; and locking means operative to lock the closer shut on the opening of the valve, and to lock the valve closed on the opening of the closer, and comprising a locker operative to lock the closer shut, an actuator secured to said load-receiver and having a linkage connection with said valve, and operative on the closing of the valve to actuate said locker and thereby unlock the closer, and adapted to be engaged by said closer-stop on the opening of said closer, thereby to lock the valve shut.

19. The combination with weighing mechanism embodying a load-receiver provided with a shiftable closer, of a valve operative to regulate the supply of material to said receiver; and means for locking the valve closed when the closer is open, and for locking the closer shut when the valve is open, and comprising a multiplicity of coacting members, a pair thereof being carried by the closer, another carried by the load-receiver and coacting with one of said closer members to lock the closer shut, and another carried by said receiver and having connection with said valve and coacting with the member carried by the receiver to assist in locking said closer shut when the valve is open, and then coacting with the other closer member of said pair to lock the valve shut when the closer is open.

20. The combination, of a load-receiver provided with a shiftable closer; means for locking the closer shut; and means for locking said closer-locking means and operable directly to actuate the same after it is unlocked therefrom, thereby to unlock the closer and permit said closer to open.

21. The combination, of a load-receiver provided with a shiftable closer; a valve operable to regulate the supply of material to said load-receiver; means for locking the closer shut; locking means operable to lock said closer-locking means, and also operative in connection with the closer to lock the valve closed on the opening of said closer.

22. The combination, of a load-receiver provided with a shiftable closer; valve mechanism operable to regulate the supply of material to said load-receiver and comprising a reducing-valve and a cut-off valve; means for locking the closer shut; means connected with the cut-off valve and operable to lock said closer-locking means; and means operative with the closer to engage said last-mentioned locking means, thereby to lock said cut-off valve closed on the opening of the closer.

23. The combination, of a bucket or receptacle provided with a shiftable closer; a valve for regulating the supply of material to said bucket; a locker operable to lock the closer shut; a lever system connected with said valve, for locking said locker and having means for actuating said locker after said lever system is unlocked therefrom, to thereby unlock said closer and permit it to open; and means operative with said closer, for engaging said lever system to lock the valve closed on the opening of the closer.

24. The combination, with weighing mechanism embodying a bucket or receptacle provided with a shiftable closer having a pair of stops, of a valve for regulating the supply of material to said bucket; a locking-latch carried by said bucket and operable to engage one of said stops, to lock the closer shut; a lever system also carried by said bucket and directly connected with said valve, for locking said latch and also having means for actuating said locking-latch after said lever system is unlocked therefrom, to thereby unlock said closer and permit it to open, and in position to be engaged by the other stop of said closer to thereby lock the valve closed on the opening of the closer.

25. The combination, of a bucket or receptacle provided with a shiftable closer; a valve for regulating the supply of material to said bucket; a locker in position to lock said closer shut and having a stop or stop-face; and an actuating-lever in position and having a recess for engaging the stop of the locker, to thereby lock the same, and operable on the actuation of said valve to lock and unlock said locker.

26. The combination, with weighing mechanism embodying a bucket or receptacle provided with a shiftable closer, of a valve for regulating the supply of material to said bucket; a locker in position to lock said closer shut and having a stop and a cam-faced part; and an actuating-lever in position and operable on the actuation of the valve and having a recess for engaging said stop, to thereby lock the locker, and having means for engaging said locker, after it is unlocked therefrom.

27. The combination, of a bucket or receptacle provided with a shiftable closer having a plurality of working parts; a valve for regulating the supply of material to the bucket; a locker carried by said bucket and also having a plurality of working parts, one operable to engage one of the working parts of the closer, to lock the same shut; a lever system also carried by said bucket and connected with said valve, and one of the members thereof likewise having a plurality of working parts, one adapted to engage a working part of said locker to lock the same, another operable to engage another working part of said locker to actuate the same after it is unlocked therefrom, and another in position to be engaged by one of the working parts of the closer for locking the valve closed on the opening of said closer.

28. The combination, with weighing mechanism embodying a bucket or receptacle provided with a shiftable closer having a pair of sector-stops, of a valve for regulating the supply of material to said bucket; a locking-latch carried by said bucket and having a pair of stops and a cam-faced part and operable to permit one of its stops to engage one of the sector-stops of said closer, to thereby lock the closer shut; a lever system carried by the bucket and operatively connected with said valve, one of the members thereof having a series of working parts, one operable to interlock with one of the stops of the locking-latch to thereby lock said latch, another adapted to engage the cam-faced part of said locking-latch to actuate the same after it is unlocked from said member, and another in position to be engaged by the other sector-stop of the closer to thereby lock the valve closed on the opening of the closer.

29. The combination, with weighing mechanism embodying a bucket or receptacle provided with a shiftable closer having a pair of sector-stops, of a valve for regulating the supply of material to said bucket; a locking-latch carried by said bucket and having a pair of stops and a cam-faced part and operable to permit one of said stops to engage one of the sector-stops of the closer, to thereby lock the same shut; a lever system carried by the bucket and embodying a link pivotally connected with said valve; and a member having a notch or recess adapted to receive one of the stops of the locking-latch to thereby lock the same, said member also having a pin operable to engage the cam-faced part of said locking-latch to actuate the same after it is unlocked therefrom; and a stop-face or stop in position to be engaged by the other sector of the closer, for locking said valve closed on the opening of the closer.

30. The combination, of a bucket or receptacle provided with a shiftable closer, a valve operable to regulate the supply of material to said bucket; means for locking said closer shut; means operable on the actuation of the valve for locking said closer-locking means; means for locking said closer open; a regulator operable in one direction by the discharging load; and means operative therewith on its return movement for unlocking the closer to thereby permit the same to shut.

31. The combination, of a bucket or receptacle provided with a shiftable closer; a valve operable to regulate the supply of material to said bucket; means for locking the closer shut; means operable on the actuation of the valve for locking said closer-locking means and for actuating said closer-locking means after it is unlocked therefrom, to unlock the closer and permit it to open; means for locking said closer open; a regulator operable in one direction by the discharging load; and means operative therewith on its return movement for unlocking the closer to thereby permit the same to shut.

32. The combination, of a bucket or receptacle provided with a shiftable closer, of a valve operable to regulate the supply of material to said bucket; means for locking the closer shut; actuating means operable on the operation of the valve, for locking said closer-locking means and for actuating said closer-locking means after it is unlocked therefrom to thereby unlock the closer and permit it to open; means operable on the actuation of the closer, for engaging said actuating means to thereby lock the valve closed on the opening of said closer; means for locking said closer open; a regulator operable in one direction by the discharging load; and means operative therewith on its return movement for unlocking the closer to thereby permit the same to shut.

33. The combination, of a bucket or receptacle provided with a shiftable closer, a valve operable to regulate the supply of material to said bucket; means operatively connected with said valve and closer and operative to lock said closer shut on the opening of the valve and to lock the valve closed on the opening of the closer; means for locking open the closer; a permanently-level regulator having movements in two intersecting planes, simultaneously, and operable in one direction by the discharging load; and means operable therewith to unlock said closer and thereby permit the same to shut.

34. The combination, of a bucket or receptacle provided with a shiftable closer; valve mechanism operable to regulate the supply of material to said bucket and comprising a reducing-valve and a cut-off valve; means in operative connection with the closer and directly connected to the cut-off valve and operative by said valve to lock the closer shut on the opening of said cut-off valve and to lock said cut-off valve closed on the opening of the closer; means for locking open the closer; a regulator-hopper operable in one direction by the discharging load; and means carried thereby and operative therewith on its return movement to unlock the closer and thereby permit the same to shut.

35. The combination, of a receptacle; a permanently-level regulator supported in position for simultaneous movement in intersecting planes and operable in one direction by the discharging load from said receptacle; a valve operable to regulate the supply of material to said receptacle; and means operative by said regulator for opening said valve.

36. In combination, with framework, of a bucket or receptacle provided with a closer shiftable for discharging the load; a valve operable to regulate the supply of material to the bucket; a movable hopper pivotally supported on said framework, for movement in intersecting planes by a plurality of parallel depending arms or levers and operable in one direction by the discharging load; a counterbalance-weight carried by one of said arms; and means connected to said weight-arm and in operative engagement with the valve, for opening the same on the return movement of the hopper.

37. The combination, of a bucket or receptacle provided with a closer shiftable for discharging the load; valve mechanism operable to regulate the supply of material to said bucket and comprising a reducing-valve operable on the movement of the bucket, and a cut-off valve; a permanently-level hopper having movements in two intersecting planes, simultaneously, and operable in one direction by the discharging load; and means in operative connection with said hopper and the cut-off valve, for opening said valve on the return movement of said hopper.

38. The combination, of a bucket or receptacle provided with a shiftable closer for discharging the load; valve mechanism operable to regulate the supply of material to said bucket and comprising a reducing-valve operable on the movement of the bucket, and a cut-off valve; a locking device for locking said closer shut; means connected with the cut-off valve and operable to both lock said locking device and actuate the same after it is unlocked therefrom, to permit the closer to open; means carried by the closer and operable in connection with the means connected to the cut-off valve, for locking said cut-off valve closed on the opening of the closer; means for locking the closer open; a permanently-level hopper having movements in two intersecting planes, simultaneously; and means operative therewith for unlocking the closer, to thereby permit the same to shut and for opening the cut-off valve.

39. The combination, of a load-receiver provided with a closer shiftable to discharge the load; a valve operable to regulate the supply of material to said load-receiver; means for locking the closer shut; means in permanent engagement with said closer-locking means and operable by said valve directly to actuate said closer-locking means, thereby to unlock the closer and permit the same to open, and also adapted to permit said closer-locking means to return into position after the closer is shut and thereby relock said closer.

40. The combination, of a load-receiver provided with a closer shiftable to discharge the load; a valve operable to regulate the supply of material to said load-receiver; means for locking the closer shut; locking means directly connected to and operable with said valve directly to actuate said closer-locking means, thereby to unlock the closer and permit the same to open, and also operable to retain said closer-locking means in its inoperative position and to permit said locking means to return into position to relock the closer after it is shut.

FRANCIS H. RICHARDS.

Witnesses:
FRED. J. DOLE,
HEATH SUTHERLAND.